United States Patent

Thebault

Patent Number: 4,461,105
Date of Patent: Jul. 24, 1984

[54] FRAME FOR TRANSPARENCIES

[75] Inventor: Claude Thebault, Meylan, France

[73] Assignee: Kis France, Grenoble, France

[21] Appl. No.: 366,706

[22] Filed: Apr. 8, 1982

[30] Foreign Application Priority Data

Apr. 15, 1981 [FR] France ................ 81 07736

[51] Int. Cl.³ .................... A47G 1/06; G09F 1/12
[52] U.S. Cl. .................... 40/152; 40/158 R; 40/159
[58] Field of Search .......... 40/152, 154, 158 R, 40/159, 152.1

[56] References Cited

U.S. PATENT DOCUMENTS

| 3,037,312 | 6/1962 | Mulch | 40/15 2 |
| 3,069,795 | 12/1962 | Lieberman | 40/152 |
| 3,477,160 | 11/1969 | Clark | 40/152 |
| 3,478,456 | 11/1969 | Mundt et al. | 40/152 |
| 3,491,471 | 1/1970 | Semple | 40/159 |
| 3,524,299 | 8/1970 | Mundt et al. | 40/152 |
| 3,996,683 | 12/1976 | Hanke | 40/152 |
| 4,237,678 | 12/1980 | Thompson | 40/152 |
| 4,314,416 | 2/1982 | Lorsch | 40/152 |

FOREIGN PATENT DOCUMENTS

| 1102106 | 5/1955 | France |  |
| 534371 | 3/1941 | United Kingdom | 40/158 R |

Primary Examiner—Gene Mancene
Assistant Examiner—James Hakomaki
Attorney, Agent, or Firm—Parkhurst & Oliff

[57] ABSTRACT

A single-piece transparency frame for holding a film therein comprising: a window-shaped opening, the width and length of which on the front face are greater than the useful length and width of the film to be inserted, and on the rear face are less than that length and width; two horizontal grooves provided in the plane of the film in the lengthwise direction of the film; two narrow sides located on the front face of the opening which are extended by parallel slots which in turn open into said horizontal grooves.

6 Claims, 14 Drawing Figures

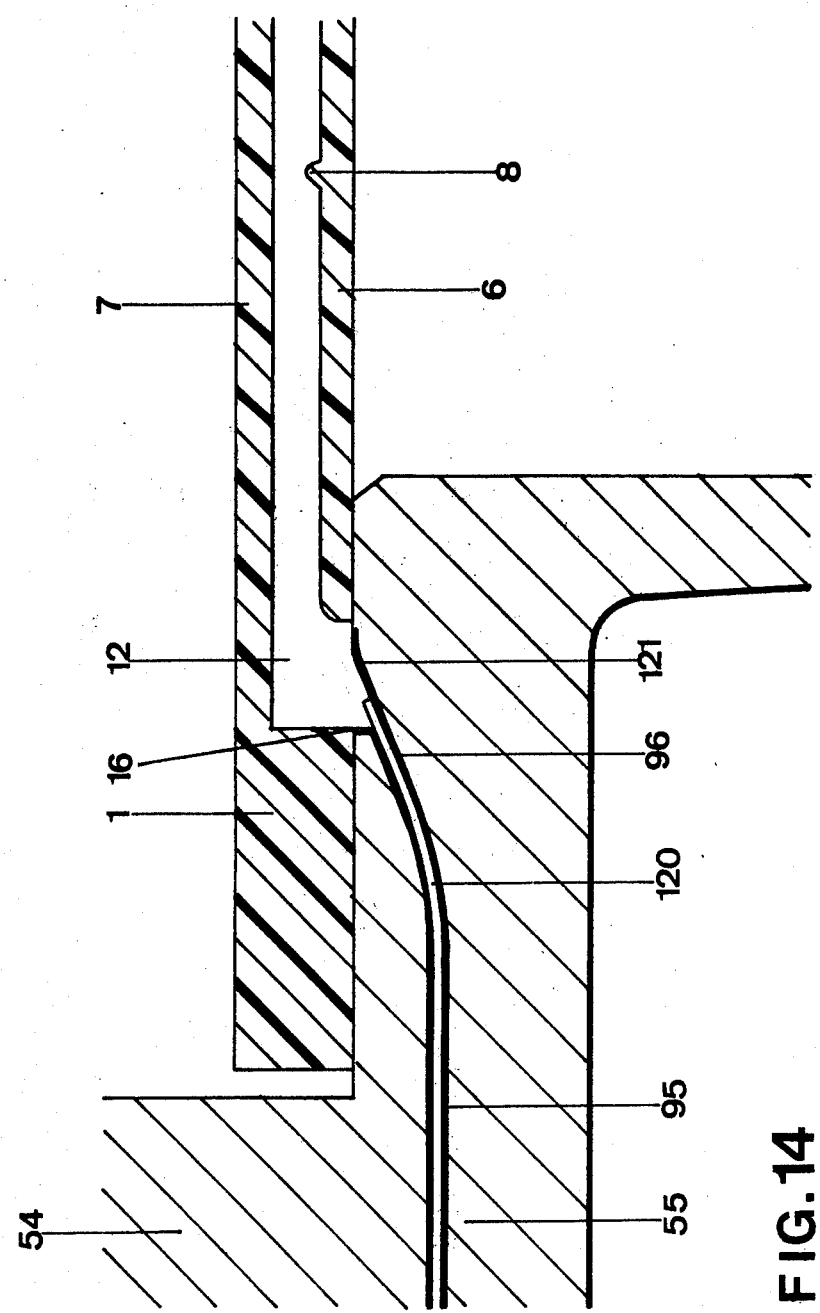

FRAME FOR TRANSPARENCIES

BACKGROUND

The present invention concerns a type of plastic frame for transparencies and also relates to means for placing positive film in the frame.

As is known in the art, a "transparency" is a positive film mounted in a frame, generally intended to be projected on a screen. Originally, the frames were of self-gluing cardboard, which had substantial drawbacks including susceptibility to being damaged and "dog-eared" and not being capable of repeated use.

An alternative proposed construction is to make such frames of plastic. Initially it was proposed to use two independent frames which could be clipped together, thereby enclosing the positive film. As a consequence, the placing of the film in position is laborious and the clipping is at times difficult. In order to assure better cohesion between the frames, they can be glued or heat-sealed which, unfortunately, does not permit them to be disassembled and used again. More recently, it has been proposed to use two clippable hinged frames. However, the drawbacks remain substantially the same.

In U.S. Pat. No. 3,069,795 there is disclosed a single-piece frame of plastic having a window-shaped opening on the edges of which horizontal grooves located in the plane of the film extend in order to facilitate the introduction of the film.

In this type of frame: (1) the length of the window opening on the side located in front of the plane of the film is greater than the length of the film to be inserted, (2) the length of the side located on the back of the film however, is less than the length of this film, and (3) the end of the grooves for receiving the film forms an abutment for the film while the distance between the ends of these grooves is at least equal to the width of the film. The placing of positive films in this type of frame, which has been successfully marketed to amateurs, is effected by means of a small manual tool especially adapted for this purpose and very easily produced. Such a tool is described in French Pat. No. 2,308,124, corresponding to U.S. Pat. No. 3,996,683. Unfortunately, this type of frame and this tool do not make it possible to economically position several hundred transparencies a day, particularly because this frame does not permit the automation of these operations.

The present invention relates to an improved frame of the type in question which makes it possible to automate the positioning of the positive films and which can be economically used in semi-professional or even industrial operations. The present invention also relates to devices for manually and automatically placing the films into the frames. Automatic devices for the placing of transparencies in frames are known. In general, these devices are complicated, expensive, bulky and do not permit economical operation for small series or individual processing. The automatic device of the invention overcomes these drawbacks.

BRIEF SUMMARY OF THE INVENTION

The single-piece, plastic transparency frame of the present invention comprises:

a window-shaped opening whose width and length on the front side are greater than the useful length and width of the film to be inserted, and on the rear side are less than said length and said width, and two horizontal grooves provided in the plane of the film in the lengthwise direction of the latter, the distance between the ends of the two opposite grooves, which form an abutment, being at least equal to the overall width of the film, the two narrow sides of the front face of the window opening are extended by parallel slots which open into said horizontal grooves and are located in the longitudinal edges of the window opening.

Advantageously, the frame is made of injected, impact-resistant, rigid plastic (high impact or semi-high-impact polystyrene); the color of the frame varying depending upon the nature and the brand of the film, which will thus facilitate the operations of the photographer when it is desired to subsequently print these films on paper. The slots of the present invention are provided on the narrow sides of the front face and extend up to the end of the lengthwise grooves; the distance between the ends of these lengthwise grooves being slightly greater than the actual width of the film. Conveniently, the width of these parallel slots is sufficient to permit the easy introduction of the film without having to exert excessive force on it. The width of the parallel slots is substantially equal to the difference in length between the window opening of the front face and the window opening of the rear face and to the difference between the overall length and the useful length of the positive film. The inner face of the upper lip of the grooves has, molded integrally therewith, bosses which are directed towards the inside and are intended to hold the film in place. The upper lips of the longitudinal grooves are provided with holes in order to lighten the frame and facilitate removal from the mold.

The present invention also concerns devices for facilitating the mounting of the film within frames. A manual version comprises a film guide formed of two parallel guide portions spaced apart by a distance greater than or equal to the overall width of the film and having upper and lower rails spaced apart by a distance greater than or equal to the thickness of the film. The guide has an inclined transverse slot which receives the frame of the invention whereby the frame is positioned so that the edge of the window opening of the frame coincides with the lower rail so that the film may be readily advanced into the longitudinal grooves of the frame.

Another embodiment of the present invention is an automatic device for mounting film within frames. The automatic device of the present invention comprises: a housing having therein a film guide in which the film is inserted; a magazine for receiving a stack of frames; a motor which drives a horizontal shaft having a cam mounted thereon; said shaft having associated therewith a driver mechanism which drives two film sprockets for advancing the film, said cam having two mechanisms operatively associated therewith; (1) a cutter for predetermined intermittent cutting of the film and (2) ejectors for discharging said filled frames from said magazine.

BRIEF DESCRIPTION OF THE DRAWINGS

The manner of implementing the present invention and the ensuing advantages will be better understood in relation to the following illustrative examples, without thereby implying an limitation.

FIG. 14 is an enlarged, detailed view of the outlet wherein the film is inserted into the frame.

DETAILED DESCRIPTION

Figure 1:
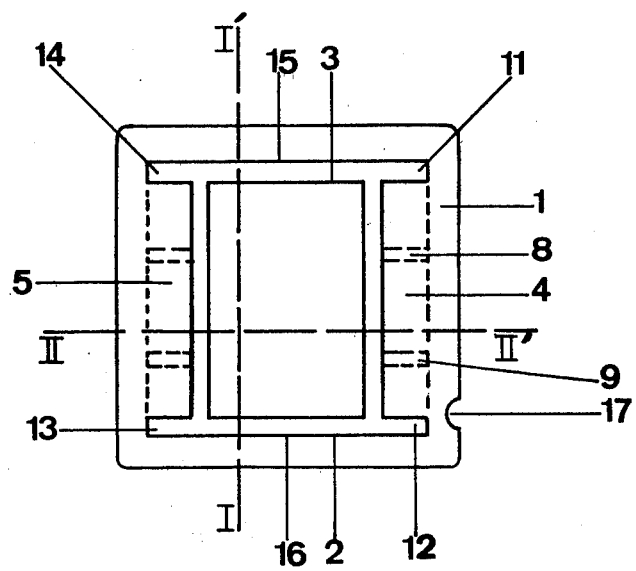
FIG. 1 is a view of an improved frame in accordance with the invention.
Figure 4:
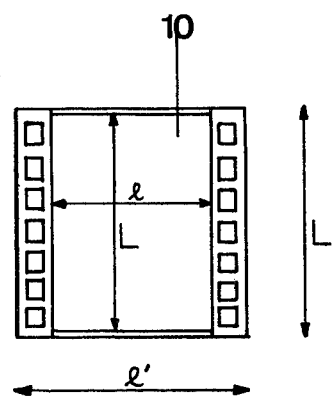
FIG. 4 is an overall diagrammatic view of a positive film which is to be inserted.
Figure 2:
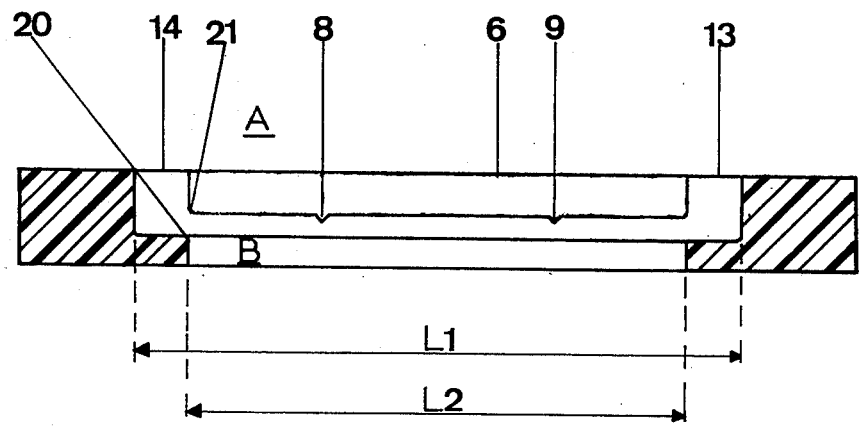
FIG. 2 is a cross sectional view of the embodiment of FIG. 1 taken along the line I—I.
Figure 3:
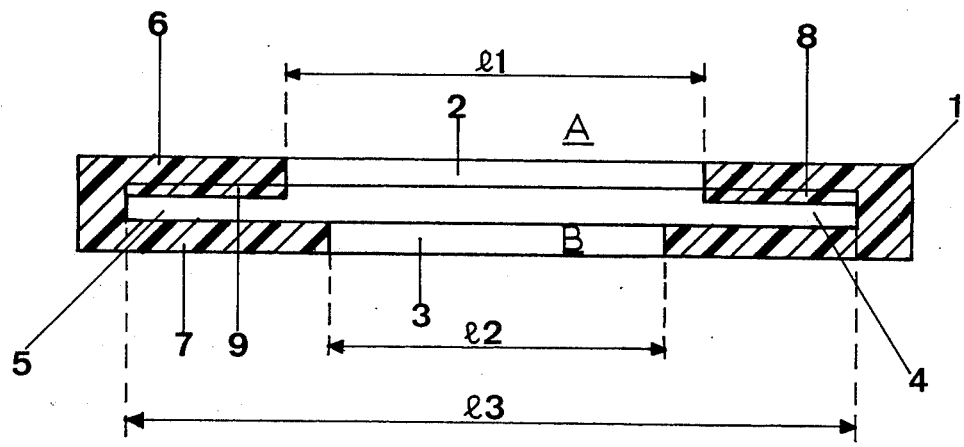
FIG. 3 is a cross sectional view of the embodiment of FIG. 1 taken along the line II—II'.
Figure 5:
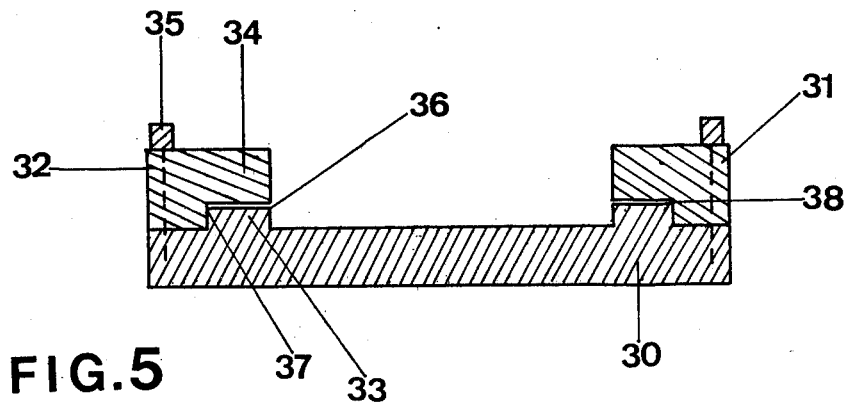
FIG. 5 is a cross sectional diagrammatic view of a further embodiment of the invention used for placing positive film in the frames.
Figure 6:
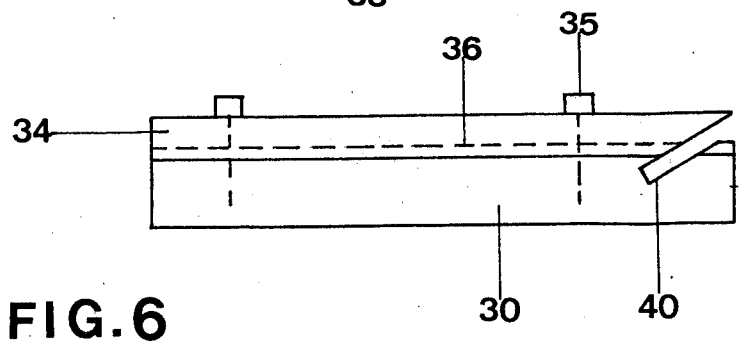
FIG. 6 is a diagrammatic side view of the embodiment of FIG. 5.
Figure 7:
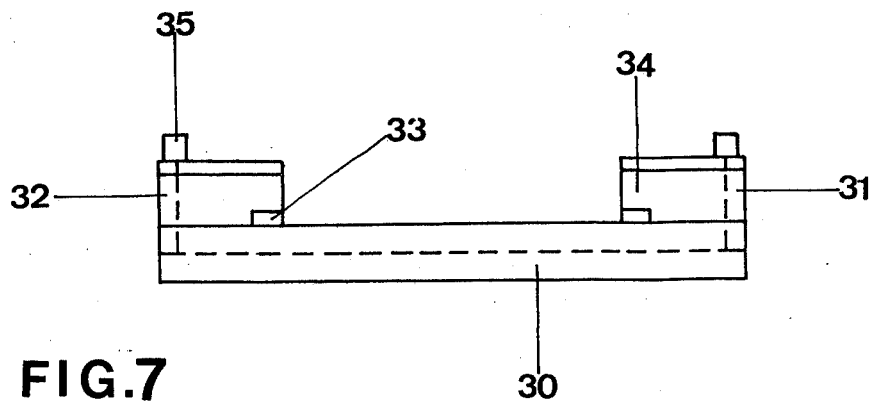
FIG. 7 is a diagrammatic front view of the embodiment of FIG. 5.
Figure 8:
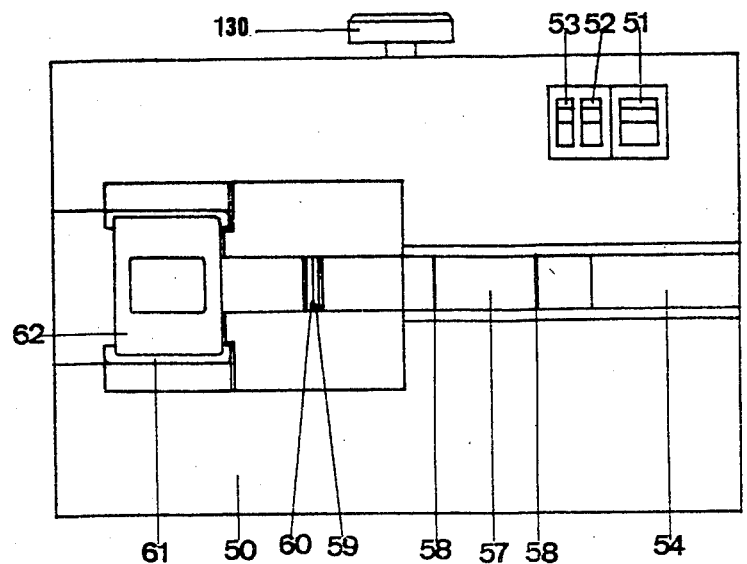
FIG. 8 is a partial plan view of a further embodiment of the present invention showing an automatic device.

Referring now to FIGS. 1 to 3, the frame 1 of colored injected semi-high-impact polystyrene comprises:

(a) on its front face A, a first window opening 2 whose length $L_1$ and width $l_1$ are slightly greater than the useful length L and width l of the positive film 10 to be inserted (see FIG. 4);

(b) on its rear face B, a second window opening 3 whose length $L_2$ and width $l_2$ are less than L and l;

(c) two opposite longitudinal horizontal grooves 4, 5 each formed of two lips, namely an upper lip 6 and a lower lip 7; the distance $l_3$ between the opposing ends of the horizontal grooves 4,5 being at least equal to the overall width l' of the positive film plus an amount for clearance (FIG. 4) whereby grooves 4,5 are provided within the overall thickness of the frame 1;

(d) the upper lip 6 of grooves 4,5 has, molded therein, two retaining bosses 8,9 adapted to assure the holding in place of the positive film 10; the walls of the bosses 8,9 being preferably inclined at an angle of 90° and the end thereof, which is intended to come into contact with the film 10, being rounded;

(e) four parallel slots 11, 12, 13, 14 provided on the two short side 15,16 of the front face A of the window opening 2 extending to the ends of the grooves 4,5; and (f) a reference notch 17.

It is highly advisable that the edges of the window openings 2,3 of the grooves 4,5 and of the frame 1 be rounded.

As an example of the physical dimensions, for a transparency frame of 24 (l) × 36 (L) mm, the frame 1 has a square shape of 50 × 50 mm; its sides being connected by radii of a curvature of 1 mm. The front face A has a window opening 2 of 25 ($l_1$) × 38.1 ($L_1$) mm, while the rear face B has a window opening 3 of 23 ($l_2$) × 35 ($L_2$) mm. The distance $l_3$ between the two opposite ends of the grooves 4,5 is 35.5 mm. Frame 1 has a thickness of about 2 mm and the radii of curvature of the corners 20 and 21 are about 0.5 mm. This thickness of the two lips 6 and 7 is 0.6 mm, and the thickness of the bosses is about 0.55 mm, so that the height available for the film to be inserted is about 0.25 mm. The slots 11, 12, 13, 14 have a width of 1.75 mm and a depth of 6.25 mm.

As stated previously, the invention also concerns a device for the placing of the positive films in the frames.

A manual version will first be described which is adapted for amateur work. This device, which is of a known type having a film guide formed of two parallel guide assemblies spaced apart by a distance at least equal to the overall width l of the positive film, each assembly being formed of an upper rail and a lower rail spaced apart by a distance at least equal to the thickness of the said film, is characterized by the following:

(a) the end of this guide has a transverse slot perpendicular to the longitudinal axis of the film and inclined with respect to the horizontal which receives the characteristic frame of the invention;

(b) the upper plane of the lower guide rail which debouches into the transverse slot coincides with the edge of one of the narrow sides of the frame which has the slots open on the grooves; and (c) the angle of inclination of the frame with respect to the plane of advance of the film within the guide is sufficient to permit the film to advance in the longitudinal grooves of the frame under the simple effect of the thrust exerted by the following film.

This manual device is formed of a base 30 over which the positive film moves; the base having on its sides two assemblies 31 and 32 for the guiding of the film and within which there is provided a lower rail 33.

An upper rail 34, held by screws 35, is spaced from the upper plane 36 of the rail 33 by a distance at least equal to the thickness of the positive film, for instance 0.25 mm. Each assembly 31 and 32 has a rail 34, and the distance between the ends 37 and 38 of the path formed by these rails 33,34 is slightly greater than the overall width l' of the film to be inserted.

One end of this manual device has a slot 40 inclined at an angle of 30°, into which the frame 1 will be placed. Once the frame 1 is positioned in this inclined slot 40, either of the edges 15 or 16 of the two short sides of the window opening 2 on the frame's front face A (on which the parallel slots 11, 12, 13, 14 are provided) coincides with the upper horizontal plane 36 of the lower rail 33. Consequently, when a push is exerted on the cut film 10 which is to be inserted, either by means of the following film or by pushing the film itself, this positive film slides over this horizontal plane 36, arrives in the vicinity of the slot 40, then penetrates into the corresponding slots of the frame 1, for instance 11,14 of the narrow side of the front face A, then strikes against the edges of the rear window opening 3 and finally penetrates into the grooves 4 and 5 until perfectly seated in them.

Note that if the angle of inclination of the inclined slot 40 were too great, the pushing forces to be applied would be excessive, which might even result in damage to the surface of the film to be inserted.

Thus, in the improved single-piece frame of the invention, the film is introduced in its lengthwise direction. This is to be contrasted with the disclosures of U.S. Pat. No. 3,069,795 or French Pat. No. 2,308,124, both of which have been mentioned in the background portion of this specification, where introduction is effected in the widthwise direction, which frequently results in damage to the surface.

When it is desired to remove the positive film which has been inserted into the frame of the invention one need only form a bend on the film in its widthwise direction so as to then release one of the sides thereby permitting easy withdrawal of the film.

Referring now to FIGS. 8 to 14; the invention also concerns a second type of device for the automatic placing of a transparency in the improved frames described above.

The automatic device for placing in a transparency frame in accordance with the invention comprises a housing 50, which can be made of, for example, zamac of a molded plastic, on the upper face of which (FIG. 8) there is: (a) a main switch 51 and two switches for individual drive 52 or repetitive drive 53; (b) a film guide formed of a lower rail 55 and an upper rail 54, between which the film to be inserted moves; (c) a sight 57 with its two positioning marks 58 for the film; (d) a paper cutter formed of a fixed part 59 and a movable part 60; and (e) a magazine 61 in which the characteristic frames 62 of the invention are stacked.

Figure 9:
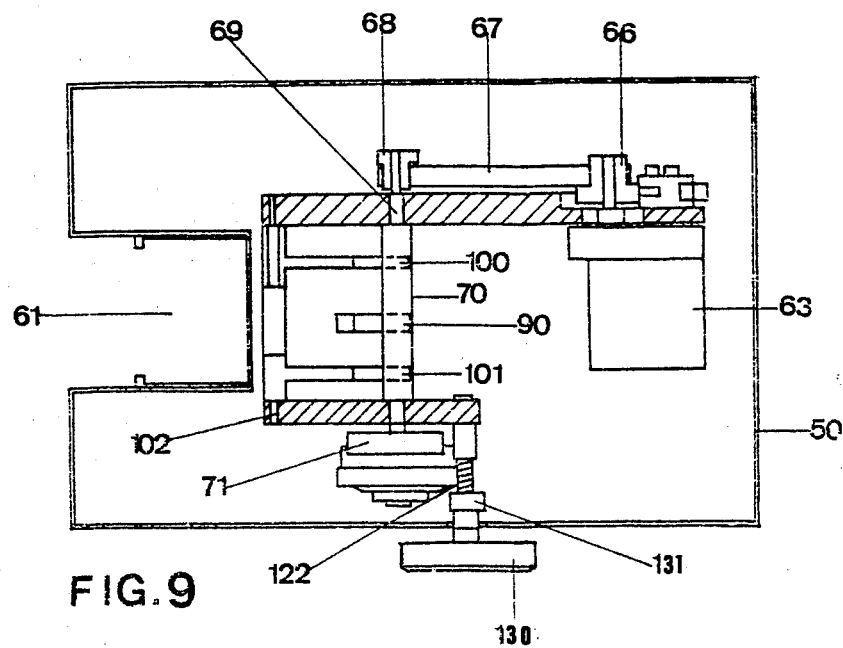
FIG. 9 is a horizontal sectional view of the embodiment of FIG. 8.
Figure 10:
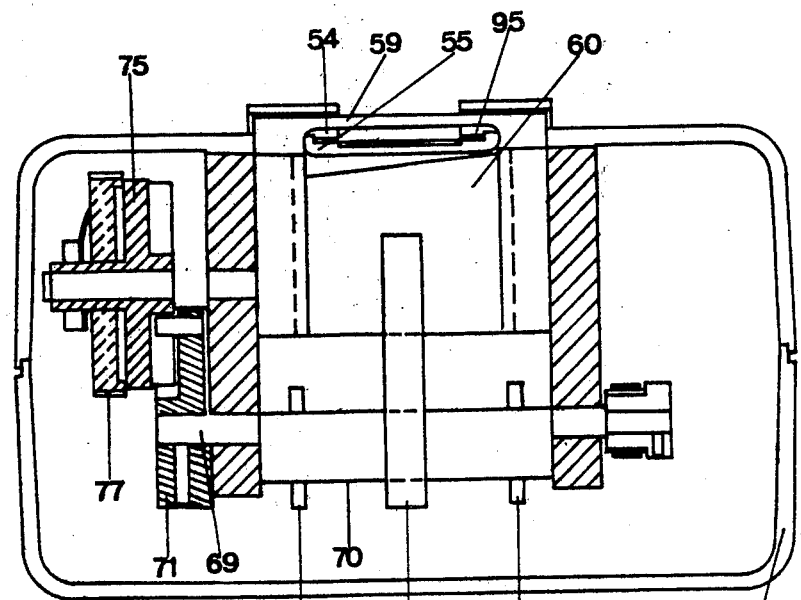
FIG. 10 is a vertical sectional view of the embodiment of FIG. 8.
Figures 12, 13:
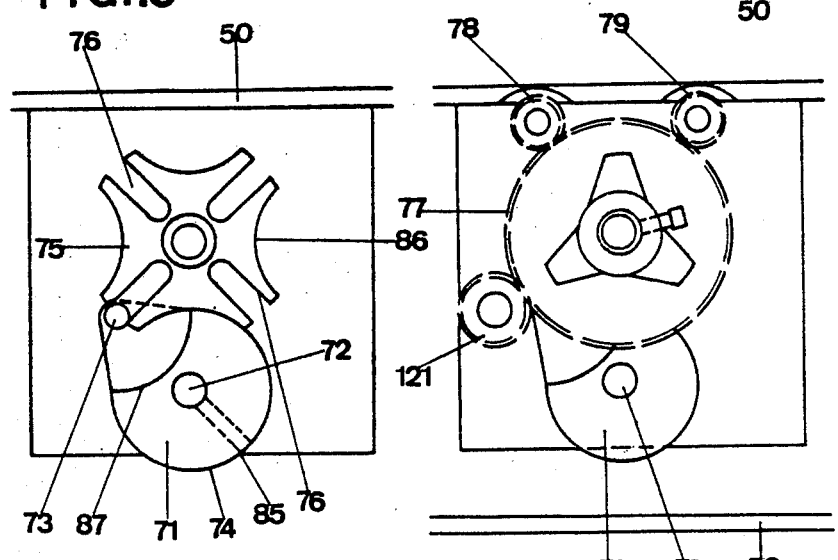
FIG. 12 is a partial cut-away view showing a portion of the driving mechanism shown to the left in FIG. 10.
FIG. 13 is another view of the driving mechanism of the embodiment of FIG. 8.

The inside of this housing (as seen in FIG. 9) has a reducer/motor 63 whose output pinion 66 drives a notched belt 67 which in its turn drives a pinion 68 which is rigidy attached to a shaft 69 with cam 70. This horizontal shaft 69 bears, at its other end, a vertical part 71 which rotates around an axis 72 which coincides with shaft 69.

The rotary vertical part 71 is provided at one end with a crank pin 73 (FIG. 12) and at its other end with a lunule 74 whose axis coincides with axis 72 and therefore with shaft 69. This crank pin 73 cooperates with a Maltese cross 75 having four arms in which guide grooves 76 are provided. This Maltese cross 75 is rigidly connected with a toothed pinion 77 (FIG. 13) with which two small toothed pinions 78 and 79 are engaged, which in turn are rigidly attached to film sprocket wheels 80,81.

When the shaft 69 makes one revolution, the part 71 makes one revolution and the Maltese cross 75, due to its four arms, makes only a quarter of a revolution and, since the ratio between the diameters of the pinion 77 and pinions 78,79 is only 1:4, the pinions 78,79 and, therefore, the sprocket wheels 80,81 make one revolution. The circumference of these sprocket wheels 80,81 is equal to the length of the film to be inserted and the distance between these two sprocket wheels 80,81 is a function of the lateral and longitudinal perforations of the film. Furthermore, this distance must be less than the length of the film so that at all times the film is always held by at least one of the two sprocket wheels 80,81, which also assures the advance of the film under the push of the following film The outer curvature 85 of the lunule 74 corresponds to the curvature 86 present at the ends of the arms of the Maltese cross 75, while its inner curvature 87 functions to merely facilitate the clearing of the ends of the grooves 76 of the Maltese cross 75.

Figure 11:
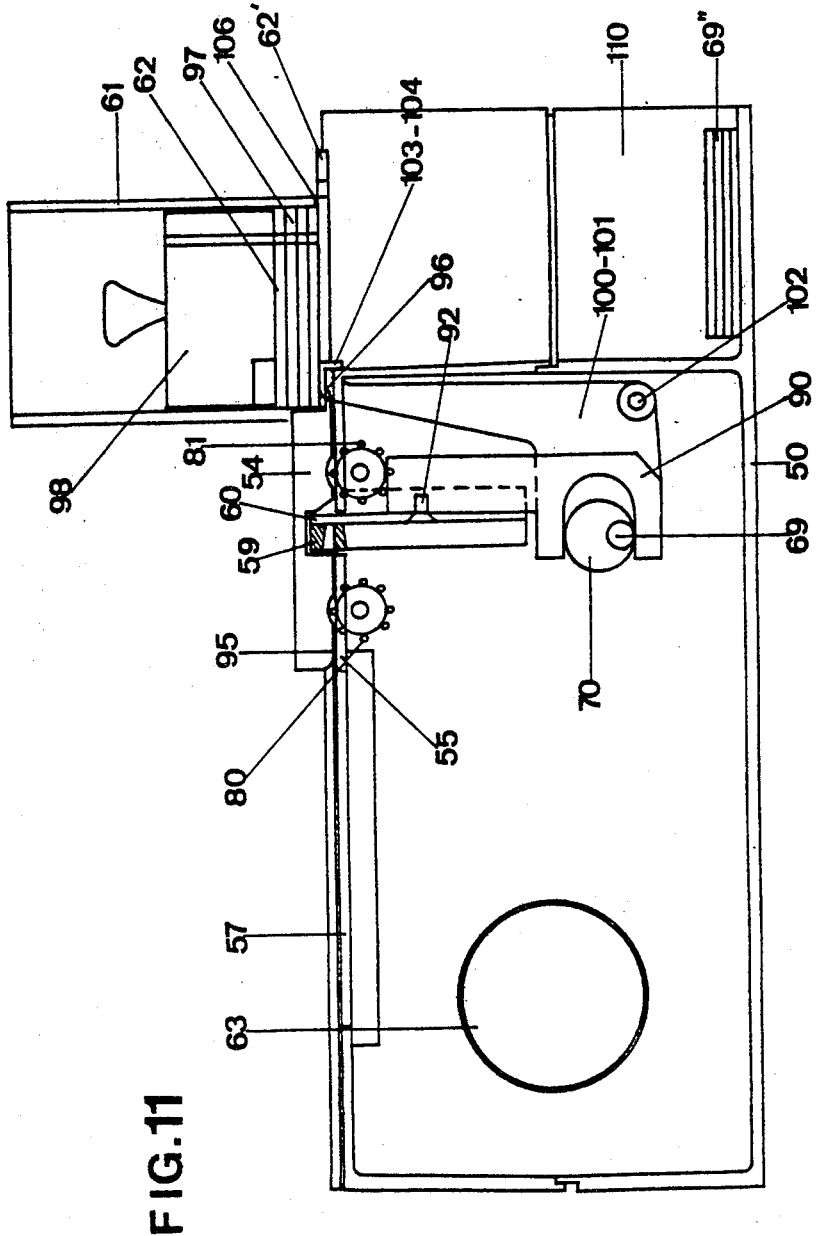
FIG. 11 is a longitudinal sectional view of the FIG. 8 embodiment.

The horizontal shaft 69 (with cam 70) is surrounded at its center by a vertical fork 90 rigidly connected with the movable knife 60 by screws 92. (FIG. 11). This fork 90 rests on the cam 70. When this cam 70 is in its bottom position, the fork 90 is in the bottom position and therefore the movable knife 60 is in bottom position, which occurs during the middle of the phase when the film is advanced.

More precisely, the phase when the film is advanced starts when the crank pin 73 enters into the groove 76 of the Maltese cross 75. At this time, the cam 70 is near its lower dead center and therefore the movable knife 60 is almost fully down. The sprocket wheels 80,81 are driven and therefore pull the cut positive film towards the right and insert it in the frame in the manner which will be described in detail hereinafter. Upon ascending, this cam 70 drives the fork 90 and, consequently, the knife 60 in an upward direction.

The path 95 is formed between the rails 54 and 55, along which path the film 120 slides, is terminated by an inclined elevated portion 96, which is shown in FIG. 14 in an enlarged size. The mouth 121 of this portion 96 coincides with the slots 12,13 provided in the narrow side 16 of the front window opening 2 of the frame of the invention. In this way, the positive film 120 which arrives on this ramp 96 pushed by the following film which has been previously cut by the cutter 59,60, driven by the sprocket wheels 80,81, slides on this ramp 96 and upon sliding over mouth 121 automatically enters these slots 12,13 of the horizontal frame 62. Within the magazine 61 there is a stack 97 of unit frames 62, held in horizontal position by a pressing weight 98 (shown in FIG. 11).

As the positive film is now held perfectly in position within the frame 62 this transparency frame must be ejected in order that the following film can in its turn be automatically inserted into another frame. In order to do this, the shaft 69 with cam 70 is also provided at its two ends with two vertical forks 100 and 101 both articulated around a fixed horizontal shaft 102 (FIG. 11). On their ends these forks have ejector noses 103,104 which come to rest precisely against the lower lateral face of the frame 62 in operation.

When the cam 70 is in lowered position, the ejectors 103,104 are retracted; i.e. they do not rest against the frame 62. On the other hand, when the cam 70 is in upward position then, through leverage, these ejectors 103,104 emerge (shown in FIG. 11) and therefore push out the filled frame 62'. In order to do this, the bottom 106 of the front face of the magazine 61 is raised (as compared with the plane of the lower rail 55 in the location of the mouth 96) by a height at least equal to the thickness of the frame 62. In this way, the filled frame 62' can move freely in a horizontal plane simple under the effect of the push of the ejectors 103,104.

As a modification, the ejectors 103,104 may also be retractable in order to facilitate the placing of the following frame 62 in position.

As already stated, the weight 98 exerts a constant pressure on the stack 97, thus avoiding the tilting of the stack; in particular at the end of the stroke.

The filled frames 69" are recovered manually within a box 110.

For the first slide or, if it is desired, during the course of operation to correct the framing of the films, the handwheel 130 (shown in FIGS. 8,9) which bears a pinion 131 and a compression spring 122 is turned by hand. This pinion 131 meshes with gear 77. A conventional friction clutch, not shown in detail, permits the disengagement of the Maltese cross 75 from the pinion 77 and thus makes it possible to turn only the sprocket wheels 80,81.

For individual drive or for the placing of the last film during repetitive drive, the pinion 66 of the motor 63 has a reference mark, for instance a notch, into which there enters the roller of a microswitch which then interrupts the electric feed.

In summary of the above, the single-piece frame for transparencies in accordance with the invention and the devices for the use thereof have numerous advantages over currently marketed varieties. Among these are:

For the frame itself:
(a) its single-piece construction
(b) its ease of manufacture
(c) the possibility of re-using it
(d) the possibility of using it in an automatic positioning process;

in the case of the manual framing device:
(a) its simplicity of construction
(b) its very low cost
(c) its very easy use in the case of the automatic framing device:
(a) its simplicity, its low cost and its reliability
(b) its compactness and small size
(c) the possibility of working either individually or with repetitive drive
(d) its ease of use, even by non-professionals.

What is claimed is:

1. A single-piece, rigid plastic transparency frame for framing a segment of film, said frame having a front face and a rear face and comprising:

a central opening in the form of a window, the width and length of which on the front face are greater than the useful length and width of the film to be inserted; and on the rear face are less than said length and width; two horizontal grooves adapted to receive a film, said horizontal grooves comprising ends which form abutments for a film to be placed therein, said horizontal grooves being positioned along the longitudinal axis of a film such that the distance between the ends of the two opposite horizontal grooves is at least equal to the overall width of the film to be inserted, said grooves further comprising means for retaining said film therein;

two narrow sides located on said front face bordering the window opening having a plurality of parallel slots extending therefrom which open into said horizontal grooves provided in the longitudinal edges of said window opening;

whereby a film may be inserted into said frame in a direction parallel to said longitudinal axis of said film by passing the film across one of said narrow sides through two of said parallel slots into said horizontal grooves.

2. The frame according to claim 1, wherein said slots which extend from said narrow sides extend up to the ends of said longitudinal grooves, the distance between the ends of said longitudinal grooves being slightly greater than the overall width of the film to be inserted.

3. The frame of claim 1, wherein said central opening comprises a front face opening and a rear face opening and the width of each of said parallel slots is substantially equal to one half the difference between the lengths of said front face opening and said rear face opening and to the difference between the overall length and the useful length of the film to be inserted.

4. The frame of claim 1, wherein said front face comprises a plurality of upper lip portions bordering said horizontal grooves, and said means for retaining said film comprises inwardly directed bosses molded in the inner face of said upper lip portions.

5. A single-piece, rigid plastic transparency frame for framing a segment of film, said frame having a front face and a rear face and comprising:

a central opening in the form of a window, the width and length of which on the front face are greater than the useful length and width of the film to be inserted, and on the rear face are less than said length and width; two horizontal grooves adapted to receive a film, said horizontal grooves comprising ends which form abutments for a film to be placed therein, said horizontal grooves being positioned along the longitudinal axis of a film such that the distance between the ends of the two opposite horizontal grooves is at least equal to the overall width of the film to be inserted, said grooves further comprising means for retaining said film therein;

two narrow sides located on said front face bordering the window opening having a plurality of parallel slots extending therefrom which open into said horizontal grooves provided in the longitudinal edges of said window opening;

said slots which extend from said narrow sides extending up to the ends of said longitudinal grooves, the distance between the ends of said longitudinal grooves being slightly greater than the overall width of the film to be inserted;

said central opening comprising a front face opening and a rear face opening, and the width of each of said parallel slots being substantially equal to one half of the difference between the lengths of said front face opening and said rear face opening and to the difference between the overall length and the useful length of the film to be inserted;

whereby a film may be inserted into said frame in a direction parallel to said longitudinal axis of said film by passing the film across one of said narrow sides through two of said parallel slots into said horizontal grooves.

6. The frame of claim 5, wherein said front face comprises a plurality of upper lip portions bordering said horizontal grooves, and said means for retaining said film comprises inwardly directed bosses molded in the inner face of said upper lip portions.

* * * * *